United States Patent
Surply et al.

(10) Patent No.: US 10,655,563 B2
(45) Date of Patent: May 19, 2020

(54) TURBOFAN NACELLE INCLUDING A REVERSER FLAP

(71) Applicants: Airbus Operations (S.A.S.), Toulouse (FR); Airbus (S.A.S.)

(72) Inventors: Thierry Surply, Cornebarrieu (FR); Alain Porte, Colomiers (FR); Patrick Oberle, Verdun sur Garonne (FR); Eric Haramburu, Colomiers (FR); Thomas Sauvalle, Toulouse (FR); Benoit Letay, Bouloc (FR); Frédéric Piard, Tournefeuille (FR); Vincent Billerot, Fonsorbes (FR); Franck Oundjian, Bonrepos sur Aussonnelle (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 307 days.

(21) Appl. No.: 15/823,053

(22) Filed: Nov. 27, 2017

(65) Prior Publication Data

US 2018/0149113 A1 May 31, 2018

(30) Foreign Application Priority Data

Nov. 28, 2016 (FR) .................................... 16 61549

(51) Int. Cl.
*F02K 1/70* (2006.01)
*F02K 1/72* (2006.01)
(Continued)

(52) U.S. Cl.
CPC .................. *F02K 1/70* (2013.01); *F02K 1/72* (2013.01); *F02K 1/763* (2013.01); *F01D 25/24* (2013.01);
(Continued)

(58) Field of Classification Search
CPC ... F02K 1/70; F02K 1/72; F02K 1/763; F02K 1/62; F02K 1/625
See application file for complete search history.

(56) References Cited

U.S. PATENT DOCUMENTS

| | | | |
|---|---|---|---|
| 3,036,431 | A | 5/1962 | Vdolek |
| 4,073,440 | A | 2/1978 | Hapke |

(Continued)

FOREIGN PATENT DOCUMENTS

| | | |
|---|---|---|
| EP | 2409921 A2 | 1/2012 |
| EP | 2573375 A2 | 3/2013 |
| WO | WO 2014/199067 A1 | 12/2014 |

OTHER PUBLICATIONS

European Search Report for European Application No. 17195101.5 dated Apr. 18, 2018.

(Continued)

*Primary Examiner* — Andrew H Nguyen
(74) *Attorney, Agent, or Firm* — Jenkins, Wilson, Taylor & Hunt, P.A.

(57) ABSTRACT

A nacelle has a fixed cowl and a mobile cowl, which is movable along a translation path between closing and opening positions, a window delimited by the fixed cowl and the mobile cowl and open between an airflow and exterior of the nacelle, a reverser flap rotatably mounted to move between closed and open positions, and a drive mechanism configured to control passage of the reverser flap between the closed and open positions as the mobile cowl moves between the closed and open positions. From the closing/closed positions, the drive mechanism assures a translation of the mobile cowl and a rotation of the reverser flap toward their respective opening/open positions. From the open/opening positions, the drive mechanism assures a rotation of the reverser flap and a translation of the mobile cowl toward (Continued)

their respective closed/closing position. In some embodiments, the nacelle further includes an additional, or second, flap.

7 Claims, 7 Drawing Sheets

(51) Int. Cl.
    *F02K 1/76*     (2006.01)
    *F01D 25/24*     (2006.01)
(52) U.S. Cl.
    CPC .... *F05D 2220/323* (2013.01); *F05D 2250/42* (2013.01)

(56) References Cited

U.S. PATENT DOCUMENTS 9,085,369 B2     7/2015    Flin et al.
2014/0131480 A1*   5/2014    Hurlin ...................... F02K 1/72
                                                             239/265.19
2016/0341150 A1* 11/2016    Chuck ...................... F02K 1/72
2016/0363097 A1* 12/2016    Foutch ...................... F02K 1/72
2018/0313297 A1   11/2018    Surply et al.

OTHER PUBLICATIONS

European Office Action for European Application No. 17195101.5 dated May 18, 2018.

French Search Report for French Application No. 1661549 dated Aug. 4, 2017.

Preinterview First Office Action and Interview Summary for U.S. Appl. No. 15/967,535 dated Dec. 16, 2019.

Notice of Allowance for U.S. Appl. No. 15/967,535 dated Feb. 28, 2020.

* cited by examiner

… turbofan nacelle including a reverser flap …

TURBOFAN NACELLE INCLUDING A REVERSER FLAP

CROSS REFERENCE TO RELATED APPLICATION

This application claims priority to co-pending French Patent Application FR 16 61549, filed Nov. 28, 2016, the content of which is incorporated by reference herein in its entirety.

TECHNICAL FIELD

The present disclosure concerns a turbofan nacelle that includes at least one reverser flap, a turbofan including a nacelle of that kind and an engine, and an aircraft including at least one such turbofan.

PRIOR ART

An aircraft includes a fuselage to each side of which is fixed a wing. Under each wing is suspended at least one turbofan. Each turbofan is fixed under the wing by, for example, a pylon that is fixed between the structure of the wing and the structure of the turbofan.

The turbofan includes an engine and a nacelle that is fixed around the engine.

The nacelle includes at least one reverser flap that is mobile between a closed position in which it becomes continuous with the exterior surface of the nacelle and an open position in which it opens a window in the wall of the nacelle to expel the air of the secondary flow to the outside.

The reverser flap is mounted mobile in rotation on the structure of the nacelle so as to pass from a closed position in which the reverser flap does not obstruct the secondary flow airflow to an open position in which the reverser flap obstructs the airflow.

Accordingly, in the open position, the reverser flap diverts a part of the secondary flow to the outside via the window.

Although the mechanism of a reverser flap of this kind is entirely satisfactory, it is desirable to find different mechanisms.

SUMMARY

An object of the present disclosure is to disclose a nacelle including at least one reverser flap with a different opening mechanism.

To this end there is disclosed a nacelle for a turbofan, the nacelle including:
a fixed cowl and a mobile cowl mobile in translation in a translation direction between a closing position in which it is close to the fixed cowl and an opening position in which it is far aft of the fixed cowl,
a window delimited on the upstream side by the fixed cowl and on the downstream side by the mobile cowl, the window being open between a secondary flow and the exterior of the nacelle,
a reverser flap mounted mobile in rotation about a rotation axis between a closed position in which it obstructs the window and an open position in which it does not obstruct the window, and
a drive mechanism adapted or configured to coordinate the passage from the closed position to the open position of the reverser flap with the passage from the closing position to the opening position of the mobile cowl and vice versa, the drive mechanism being adapted or configured to realize a first combination assuring, from the closed position and from the closing position:
an aft translation of the mobile cowl in the translation direction to move the mobile cowl from the closing position to the opening position, and
a rotation of the reverser flap about the rotation axis to move the reverser flap from the closed position to the open position, and
the drive mechanism is also adapted or configured to realize a second combination assuring, from the open position and from the opening position:
a rotation in the reverse direction of the reverser flap about the rotation axis to move the reverser flap from the open position to the closed position, and
a forward translation of the mobile cowl in the translation direction to move the mobile cowl from the opening position to the closing position,
the nacelle comprising an additional, or second, flap mounted mobile in rotation about a rotation axis between a retracted position in which it is not positioned in the airflow and an active position in which it is positioned across the airflow and extends the reverser flap in the open position in the airflow, and the drive mechanism is configured to coordinate passage of the additional flap from the retracted position to the active position with the passage of the reverser flap from the closed position to the open position, and vice versa.

The additional flap advantageously carries a seal that is positioned between the reverser flap and the additional flap when the reverser flap is in the open position and the additional flap is in the active position.

The nacelle advantageously includes at least one deflector that is disposed around the airflow at the level of the entry of the window.

According to one embodiment, the drive mechanism comprises:
a motor element with a mobile part secured to the mobile cowl to drive it in translation,
a guide secured to the mobile cowl and that comprises a slide part the axis of which is parallel to the translation direction of the mobile cowl and a rotation part that extends the slide part forward and is offset relative to the slide part,
a slider accommodated in the guide,
a first articulated link between the slider and the reverser flap,
a second articulated link between the slider and the additional flap,
an abutment adapted or configured to move the slider of the rotation part toward the slide part when the reverser flap is in the closed position and the additional flap is in the retracted position and the mobile cowl is moved from the opening position to the closing position.

According to one particular embodiment, the drive mechanism comprises:
an actuator with a first rod secured to the mobile cowl and a second rod,
an activator adapted or configured to selectively move the first rod and the second rod,
a first articulated link between the second rod and the reverser flap,
a second articulated link between the second rod and the additional flap.

According to one particular embodiment, the drive mechanism is adapted or configured to move the reverser flap and the mobile cowl simultaneously.

According to another particular embodiment, the drive mechanism is adapted or configured to assure a delayed movement of the reverser flap in the first combination and a delayed movement of the mobile cowl in the second combination.

According to one particular embodiment, the drive mechanism includes a first actuator mounted articulated between the reverser flap and a structure of the nacelle, at least one second actuator mounted articulated between the mobile cowl and the structure of the nacelle, and a control unit adapted or configured to control the lengthening and the shortening of each actuator According to another particular embodiment, the drive mechanism includes at least one articulated link mounted between the reverser flap and the mobile cowl, at least one second articulated actuator mounted between the mobile cowl and the structure of the nacelle, and a control unit adapted or configured to control the lengthening and the shortening of each second actuator.

Each second actuator is advantageously equipped with a brake that is controlled by the control unit and locks the second actuator in position.

The drive mechanism advantageously includes two second actuators and a fixed connection between the rods of the two second actuators.

According to another particular embodiment, the drive mechanism includes two racks fixed to the mobile cowl and aligned with the translation direction, a pinion for each rack fixed to the structure of the nacelle to mesh with the teeth of the rack, a motor adapted or configured to drive each pinion in rotation, and a control unit adapted or configured to control the motor.

The disclosure herein also discloses a turbofan including an engine and any of the above variants of a nacelle surrounding the engine and in which a secondary airflow is delimited between the nacelle and the engine.

The disclosure herein also discloses an aircraft including at least one turbofan in accordance with the above variant.

BRIEF DESCRIPTION OF THE DRAWINGS

The features of the disclosure herein mentioned above along with others will become more clearly apparent on reading the following description of one embodiment, the description being given with reference to the appended drawings, in which.

DETAILED DESCRIPTION

Figure 1:
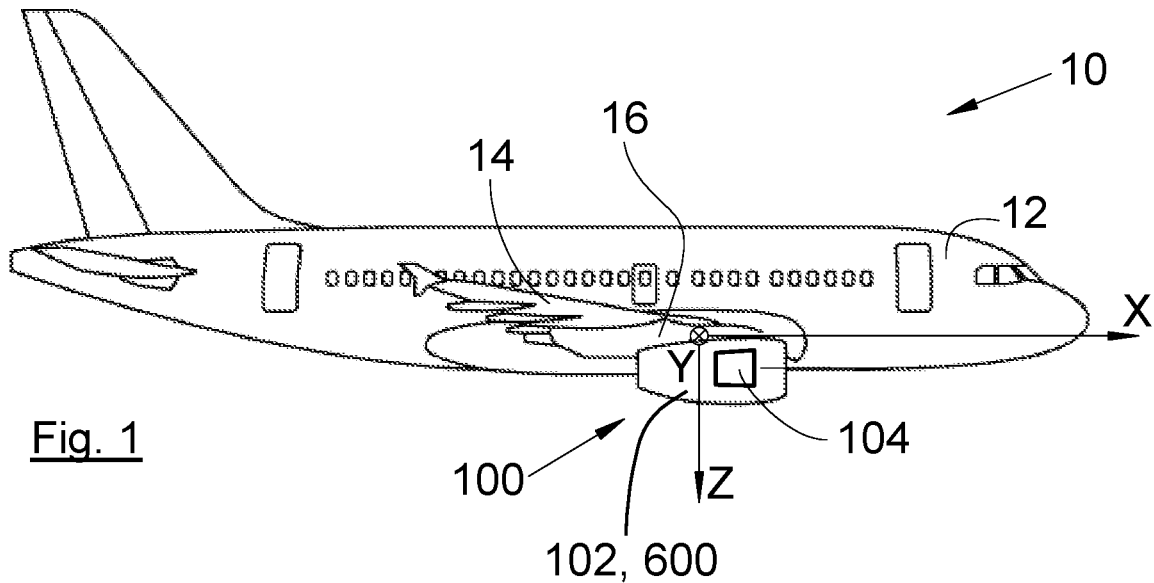
FIG. 1 is a side view or an aircraft including a nacelle according to the disclosure herein.

In the following description, terms relating to a position are referred to an aircraft in a forward movement position as shown in FIG. 1.

FIG. 1 shows an aircraft 10 that includes a fuselage 12 to each side of which is fixed a wing 14 that carries at least one turbofan 100 according to the disclosure herein. The turbofan 100 is fixed under the wing 14 by a pylon 16.

Figure 4:
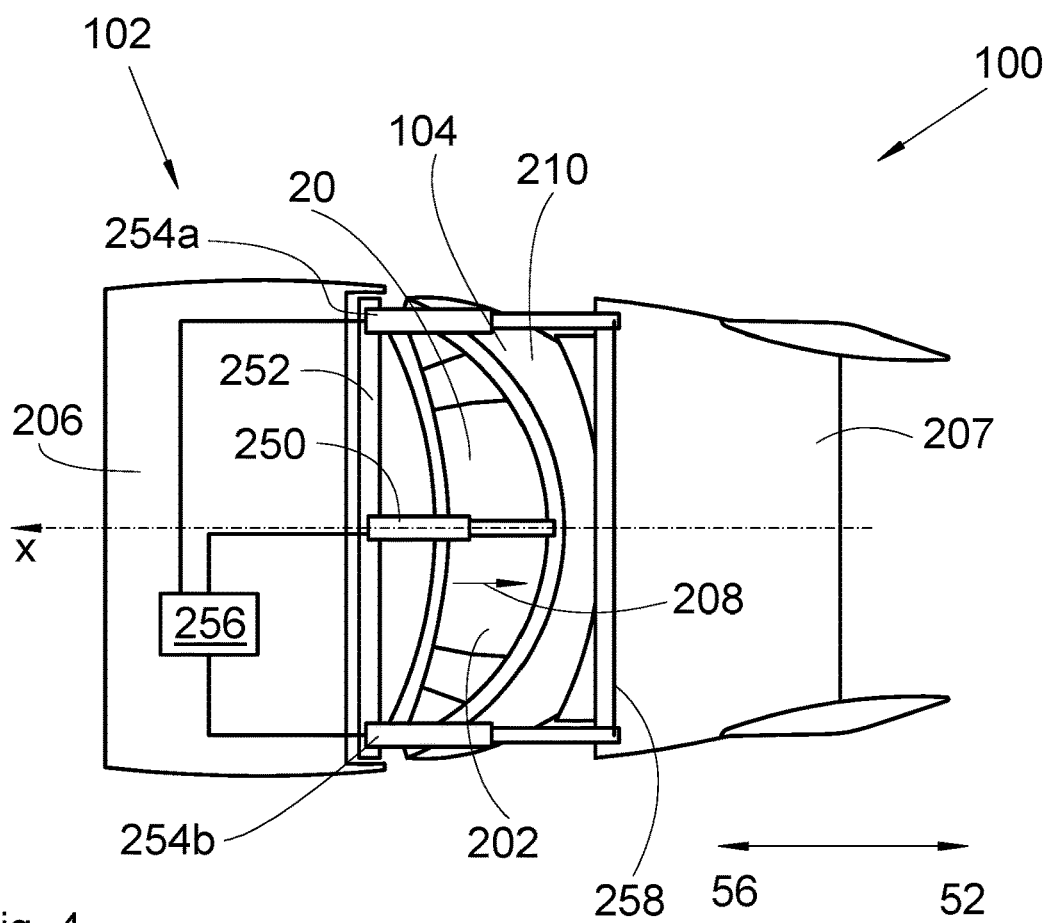
FIG. 4 is a top view of the nacelle according to the disclosure herein in the open configuration for a first variant of a drive mechanism.
Figure 5:
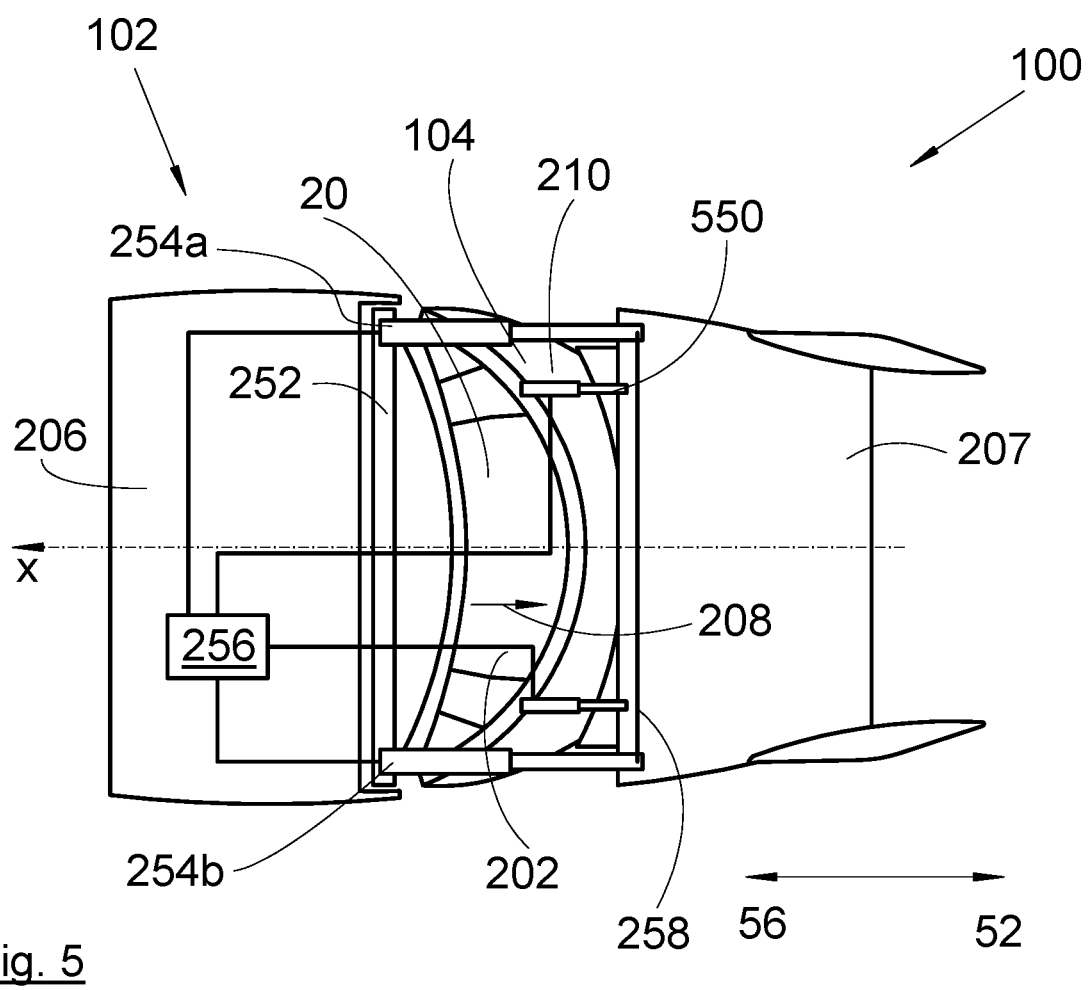
FIG. 5 is a top view of the nacelle according to the disclosure herein in the open configuration for a second variant of a drive mechanism.
Figure 6:
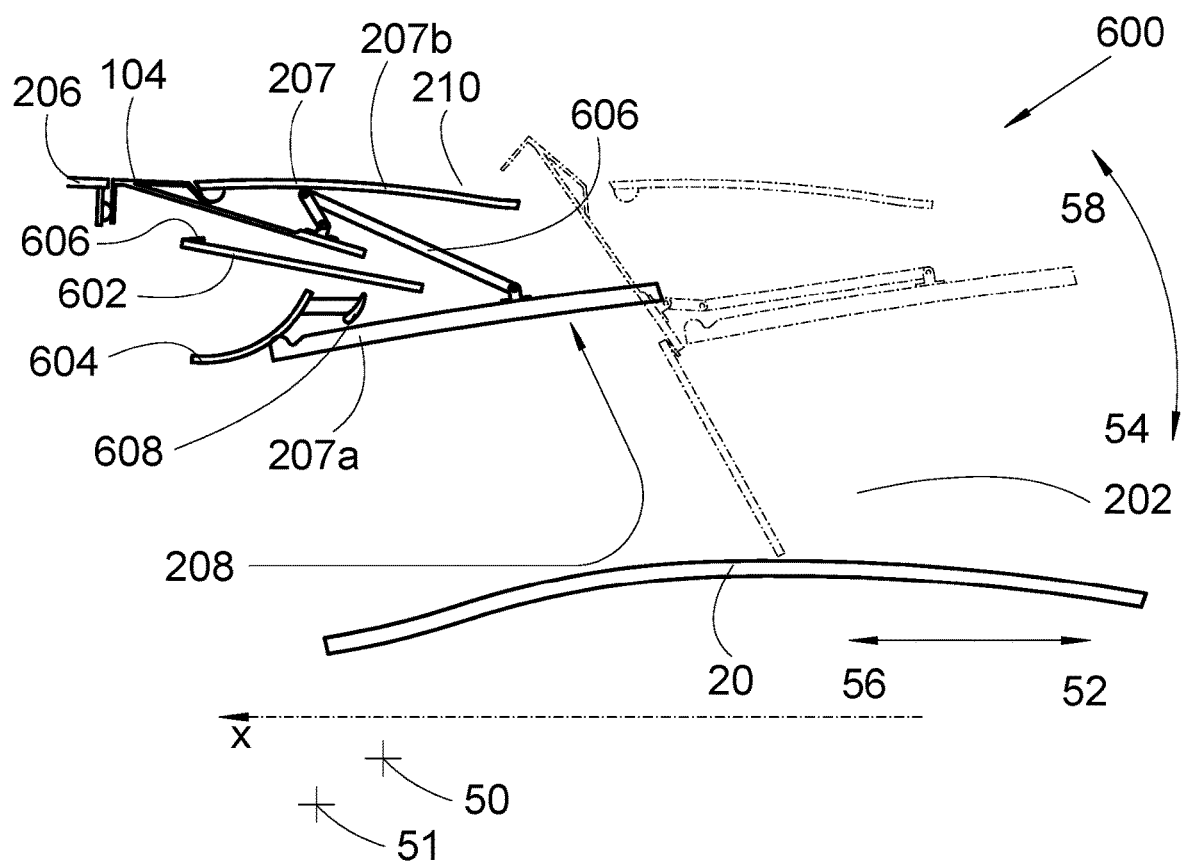
FIG. 6 is a diagrammatic sectional representation of a nacelle according to another variant of the disclosure herein.

FIGS. 1 through 5 show a nacelle 102 according to a first embodiment of the disclosure herein and FIG. 6 shows a nacelle 600 according to a second embodiment of the disclosure herein.

The turbofan 100 includes a nacelle 102, 600 and an engine that is housed inside the nacelle 102.

Figure 2:
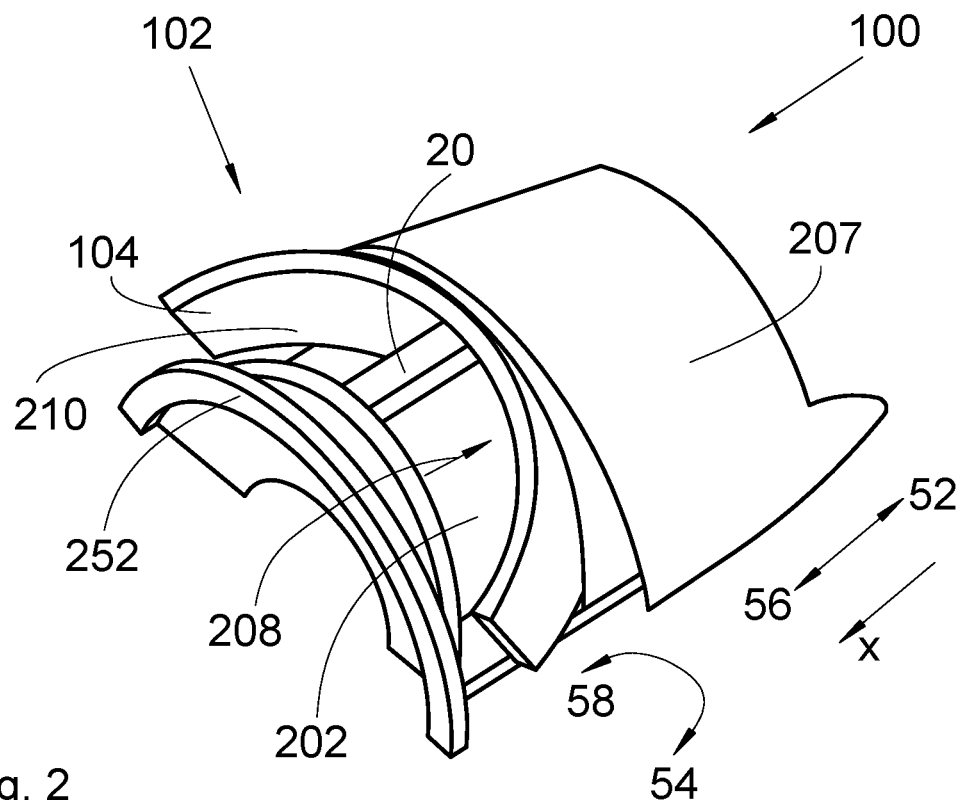
FIG. 2 is a perspective view of the nacelle according to the disclosure herein in an open configuration.
Figure 3:
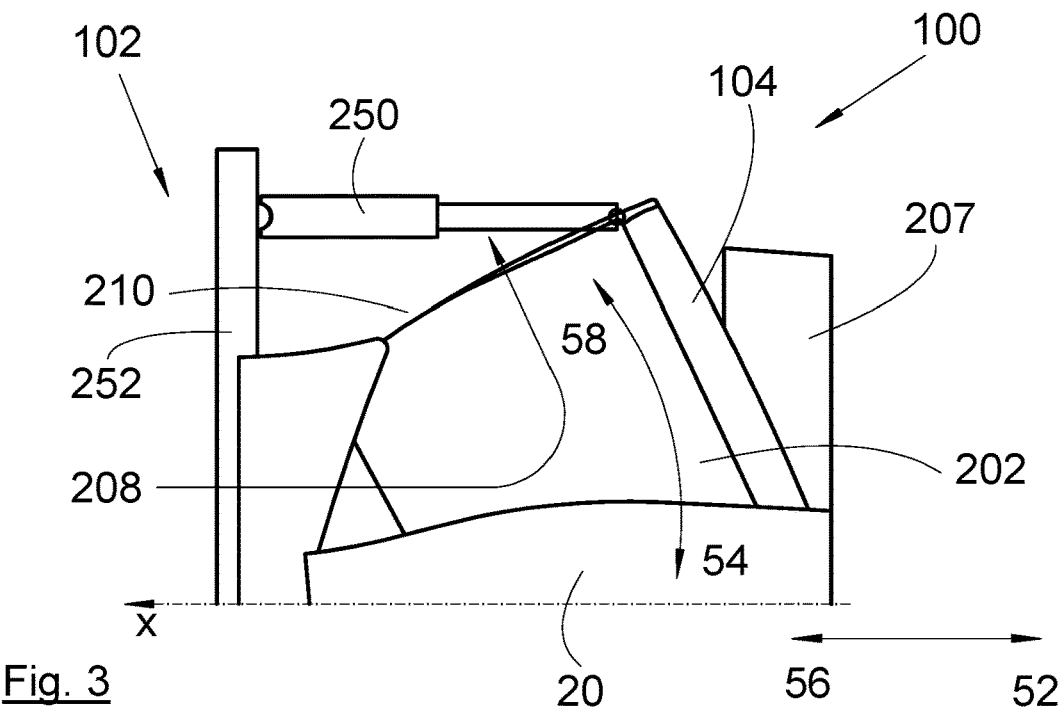
FIG. 3 is a section on a radial plane of the nacelle according to the disclosure herein in an open configuration.

As shown in FIGS. 2 through 4, as well as in FIGS. 5 and 6, the turbofan 100 has an airflow 202 between the nacelle 102 and the engine 20 in which the secondary flow 208 circulates.

In the following description, and by convention, x denotes the longitudinal axis of the nacelle 102 that is parallel to the longitudinal or roll axis X of the aircraft 10 oriented positively in the direction of forward movement of the aircraft 10, Y denotes the transverse axis or pitch axis of the aircraft which is horizontal when the aircraft is on the ground, and Z denotes the vertical axis or vertical height or yaw axis when the aircraft is on the ground, these three directions X, Y and Z being mutually orthogonal and forming an orthonomic frame of reference the origin of which is the centre of gravity of the aircraft.

The nacelle 102 includes at least one reverser flap 104. In particular, there can be two reverser flaps 104 disposed one in front of the other, or four reverser flaps 104 regularly distributed over the periphery of the nacelle 102.

In the following description the disclosure herein is more particularly described for one reverser flap 104, but the description applies in the same manner to each reverser flap 104 when there is more than one of them.

For each reverser flap 104 the nacelle 102 includes an open window 210 between the airflow 202 and the exterior of the nacelle 102.

The nacelle 102 features a fixed cowl 206 that delimits the window 210 on the upstream side relative to the longitudinal axis x and that is fixedly mounted on a structure of the nacelle 102.

The nacelle 102 features a mobile cowl 207 that delimits the window 210 on the downstream side relative to the longitudinal axis x. The mobile cowl 207 is mounted mobile in translation in a translation direction globally parallel to the longitudinal axis x on the structure of the nacelle 102. The translation is effected by any appropriate mechanism and/or structure, such as, for example, slides.

The fixed cowl 206 and the mobile cowl 207 feature an exterior surface that constitutes the exterior envelope of the nacelle 102 and an interior surface that constitutes an exterior wall of the airflow 202.

The mobile cowl 207 is mobile between a closing position in which it is close to the fixed cowl 206 and an opening position in which it is far aft of the fixed cowl 206 so as to enlarge the window 210.

The reverser flap 104 is mounted mobile in rotation about a rotation axis on the structure of the nacelle 102 between a closed position in which it obstructs the window 210 and an open position in which it does not obstruct the window 210. Here, in the embodiment of the disclosure herein shown in FIGS. 2 through 4, the rotation axis is perpendicular to the longitudinal axis x.

In the closed position, the reverser flap 104 is positioned between the fixed cowl 206 and the mobile cowl 207, which is in the closing position, and the reverser flap 104 extends the mobile cowl 207 and the fixed cowl 206 and the reverser flap 104. In the open position the mobile cowl 207 is moved aft to facilitate the maneuvering of the reverser flap 104 from the closed position to the open position.

When the reverser flap 104 is in the closed position, the exterior surface of the reverser flap 104 extends between the exterior surface of the fixed cowl 206 and the exterior surface of the mobile cowl 207 and its interior surface extends between the interior surface of the fixed cowl 206 and the interior surface of the mobile cowl 207 to delimit the airflow 202.

When the reverser flap 104 is in the open position, the reverser flap 104 crosses the airflow 202 and diverts at least a part of the secondary flow 208 to the outside through the window 210.

The passage of the reverser flap 104 from the closed position to the open position is coordinated with the passage of the mobile cowl 207 from the closing position to the opening position and vice versa.

This coordination is assured by a drive mechanism that, starting from the closed position and the closing position, realizes a first combination assuring:
- an aft translation (arrow 52) of the mobile cowl 207 in a translation direction globally parallel to the longitudinal axis x that assures the movement of the mobile cowl 207 from the closing position to the opening position, and
- a rotation (arrow 54) of the reverser flap 104 about the rotation axis that assures the movement of the reverser flap 104 from the closed position to the open position.

Conversely, the passage of the reverser flap 104 from the open position to the closed position is assured by the same mechanism that is also adapted or configured to realize a second combination assuring from the open position and the opening position:
- a rotation in the reverse direction (arrow 58) of the reverser flap 104 about the rotation axis that assures the return of the reverser flap 104 from the open position to the closed position, and
- a forward translation (arrow 56) of the mobile cowl 207 in the translation direction that assures the movement of the mobile cowl 207 from the opening position to the closing position.

The references in FIG. 6 that are identical to the references of the previous embodiment represent the same elements. In FIG. 6, the elements in solid line represent elements in the closed/closing position and the elements in chain-dotted line represent the same elements in the open/opening position. The elements described with reference to the previous embodiments apply equally to the embodiment of FIGS. 6 through 8C.

In the FIG. 6 embodiment the reverser flap 104 has a length along the longitudinal axis x that is reduced relative to that of the previous embodiment.

To fill the gap between the reverser flap 104 and the engine 20 the nacelle 600 features an additional flap 602 which in the open/opening position extends between the reverser flap 104 and the engine 20 in order to obstruct the airflow 202. The provision of an additional flap 602 of this kind also makes it possible to improve the forward deviation of the secondary flow 208 and to reduce noise.

The additional flap 602 is mobile between a retracted position (solid lines) in which it is not positioned in the airflow 202 and an active position (chain-dotted lines) in which it is positioned across the airflow 202 to divert the secondary flow 208. The passage from the retracted position to the active position is effected in a manner coordinated with the passage from the closed position to the open position and vice versa. In the active position the additional flap 602 therefore extends the reverser flap 104 in the open position in the airflow 202 as far as the engine 20 to divert the secondary flow 208.

In the embodiment of the disclosure herein shown in FIG. 6 the mobile cowl 207 features an interior wall 207a and an exterior wall 207b that are moved in the same manner and simultaneously. The exterior wall 207b is the wall that comes into alignment with the reverser flap 104 in the closing position and constitutes an exterior wall of the nacelle 600 and the interior wall 207a defines the peripheral surface of the airflow 202 around the engine 20.

In the closing/closed position, the reverser flap 104 is accommodated in part between the interior wall 207a and the exterior wall 207b and the additional flap 602 is in the retracted position and accommodated between the interior wall 207a and the exterior wall 207b.

In the opening/open position the reverser flap 104 and the additional flap 602 in the active position are positioned upstream of the interior wall 207a and the exterior wall 207b and across the airflow 202.

The nacelle 600 also features an upstream wall 604 that extends upstream of the interior wall 207a relative to the longitudinal axis x and constitutes an exterior wall of the airflow 202 around the engine 20. The upstream wall 604 is fixed relative to the structure of the nacelle 600 and is situated substantially at the level of the front frame. In the closing position, at an upstream end, the interior wall 207a extends the upstream wall 604 and in the opening position the interior wall 207a is far away from the upstream wall 604 so as to open the passage between the airflow 202 and the window 210 and to allow the placing therein of the reverser flap 104 and the additional flap 602.

As before, the reverser flap 104 is mounted mobile in rotation about a rotation axis 50 on the structure of the nacelle 600 to pass from the closed position to the open position and vice versa.

The movements of the mobile cowl 207 and the reverser flap 104 conform to those described above and assured by an appropriate drive mechanism.

In the embodiment of the disclosure herein shown in FIG. 6 the drive mechanism is configured to move the mobile cowl 207 from the closing position to the opening position and vice versa and, to this end, can include, for example, slides, actuators, motors, or any other appropriate mechanisms and/or structures for moving an element in translation.

Here the drive mechanism also comprises a set of links which here comprises two links articulated to each other and the end of one of which is articulated to the mobile cowl 207, here to the interior wall 207a, and the end of the other of which is articulated to the reverser flap 104.

The movement of the mobile cowl 207 therefore drives a movement of the links that pulls or pushes the reverser flap 104.

Here the additional flap 602 is also mounted mobile in rotation about a rotation axis 51 on the structure of the nacelle 600 to pass from the retracted position to the active position and vice versa. Here the two rotation axes 50 and 51 are different, but in other configurations they can be identical.

The movements of the additional flap 602 are similar to and synchronized with those of the reverser flap 104. To this end the drive mechanism is configured to coordinate the movements of the additional flap 602 with those of the reverser flap 104; that is to say, the passage of the additional flap 602 from the retracted position to the active position is coordinated with the passage of the reverser flap 104 from the closed position to the open position, and vice versa. This coordinated movement can be achieved, for example, by links that connect the additional flap 602 and the reverser flap 104, a motor, or actuators controlled as a function of the movement of the reverser flap 104.

To provide a good seal between the reverser flap 104 and the additional flap 602, the latter features a seal 606 of the lip seal type that is pressed against the reverser flap 104 in the open/active position. The seal 606 is therefore positioned between the reverser flap 104 and the additional flap 602.

For even better control of the secondary flow 208 when the window 210 is open, the nacelle 600 includes at least one deflector 608 that is disposed around the airflow 202 at the level of the entry of the window 210, i.e. globally at the level of the zone of passage from the airflow 202 to the window 210.

Each deflector 608 is fixed to the structure of the nacelle 600 and here is fixed to the upstream wall 604. Each deflector 608 takes the form of an aileron that orients the secondary flow 208 toward the window 210.

In the closing position, each deflector 608 is accommodated in the mobile cowl 207, i.e. between the interior wall 207a and the exterior wall 207b.

The drive mechanism can be adapted or configured to assure simultaneous movements of the reverser flap 104 and the mobile cowl 207 in the two combinations provided that the dimensional characteristics of the reverser flap 104 and the mobile cowl 207 do not create any interference between them during their movements.

The drive mechanism can also be adapted or configured to assure a delayed movement of the reverser flap 104 in the first combination and a delayed movement of the mobile cowl 207 in the second combination.

In the embodiment of the disclosure herein shown in FIGS. 3 and 4, the drive mechanism includes a first articulated actuator 250 mounted between the reverser flap 104 and the structure of the nacelle 102, in particular with the front frame 252, and at least one second articulated actuator 254a-b (here two of them) mounted between the mobile cowl 207 and the structure of the nacelle 102, in particular with the front frame 252.

Each actuator 250, 254a-b can be electric, hydraulic or pneumatic or otherwise.

The drive mechanism also includes a processor type control unit 256 that controls the lengthening and the shortening of each actuator 250, 254a-b according to the requirements of the aircraft 10 whether simultaneously or in a deferred manner.

Here the cylinder of the second actuator 254a-b is articulated to the front frame 252 and the rod is articulated to the mobile cowl 207.

Here the cylinder of the first actuator 250 is articulated to the front frame 252, and the rod is articulated to the reverser flap 104.

The control unit 256 therefore commands the extension of the actuators 250 and 254a-b to pass from the closed/closing position to the open/opening position and conversely the retraction of the actuators 250 and 254a-b to pass from the open/opening position to the closed/closing position.

To assure the locking of the mobile cowl 207 in the opening position each second actuator 254a-b is equipped with a brake that is controlled by the control unit 256 and locks the second actuator 254a-b in position.

It is equally possible for the reverser flap 104 to be retained in its closed position by a set of locks assuring the retention of the reverser flap 104 in the closed position and to comply with aerodynamic constraints.

When the drive mechanism includes two second actuators 254a-b, to prevent too great an offset between the positions of the two second actuators 254a-b the drive mechanism includes a link 258 fixed between the rods of the two second actuators 254a-b and if a second actuator 254a lags behind the other second actuator 254b the link 258 therefore pulls on the lagging second actuator 254a.

FIG. 5 shows a variant embodiment in which the first actuator 250 is replaced by at least one articulated link 550 mounted between the reverser flap 104 and the mobile cowl 207. In this case the movements of the reverser flap 104 and the mobile cowl 207 are synchronized.

The link or links 550 can be disposed centrally or at the sides of the mobile cowl 207.

To desynchronize movements of the reverser flap 104 and the mobile cowl 207 the link is connected to the mobile cowl 207 by a mobile fitting driven by the mobile cowl from a position allowing rotation of the reverser flap 104 without interference with the mobile cowl 207.

In another embodiment each of the two second actuators 254a-b is replaced by a rack system and the drive mechanism therefore includes two racks fixed to the mobile cowl 207 and aligned with the translation direction and, for each rack, a pinion fixed to the structure of the nacelle 102 and mobile in rotation about an axis perpendicular to the translation direction to mesh with the teeth of the rack. The drive mechanism also includes a motor controlled by a control unit and adapted or configured to drive each pinion in rotation. The transmission of movement between the motor and each pinion is effected via a transmission system that can comprise gears, flexible transmission shafts or otherwise. The control unit is of the same type as before.

The motor can be hydraulic or electric or otherwise.

The embodiments of the drive mechanism shown in FIGS. 3 to 5 can also be used in the context of FIG. 6, with the features associated with the coordinated movements of the mobile cowl 207 and the additional flap 602 being added thereto.

Figure 7A:
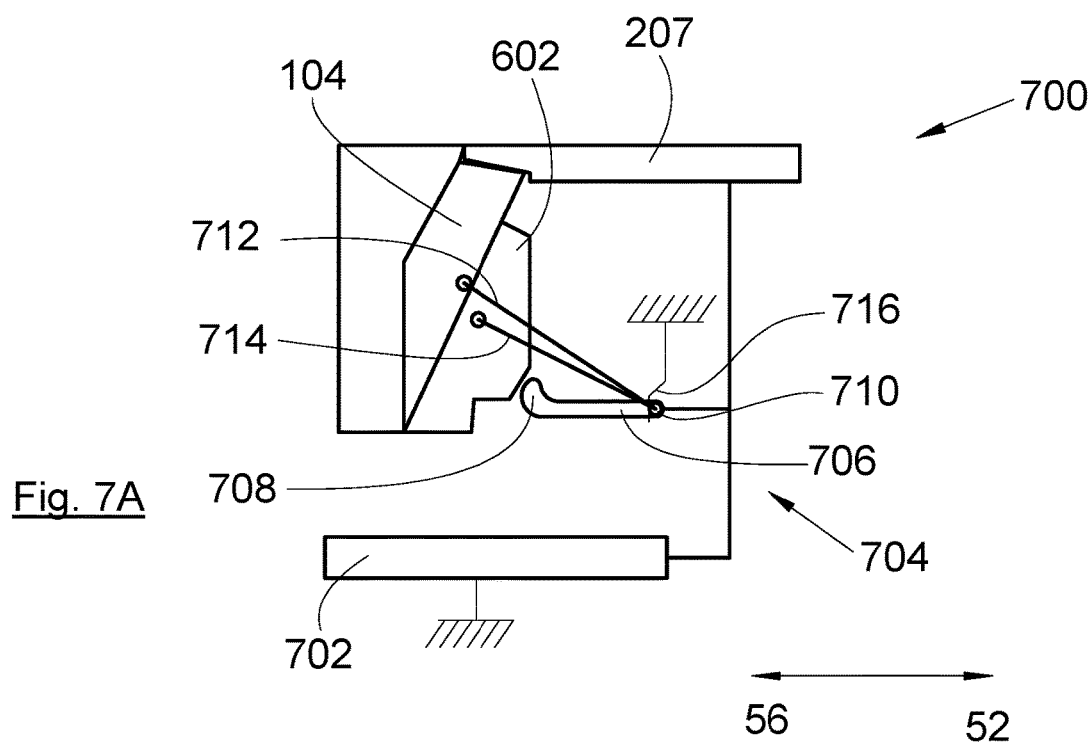
FIGS. 7A-C show one embodiment of a connection between a mobile cowl and a reverser flap in various positions.
Figure 7B:
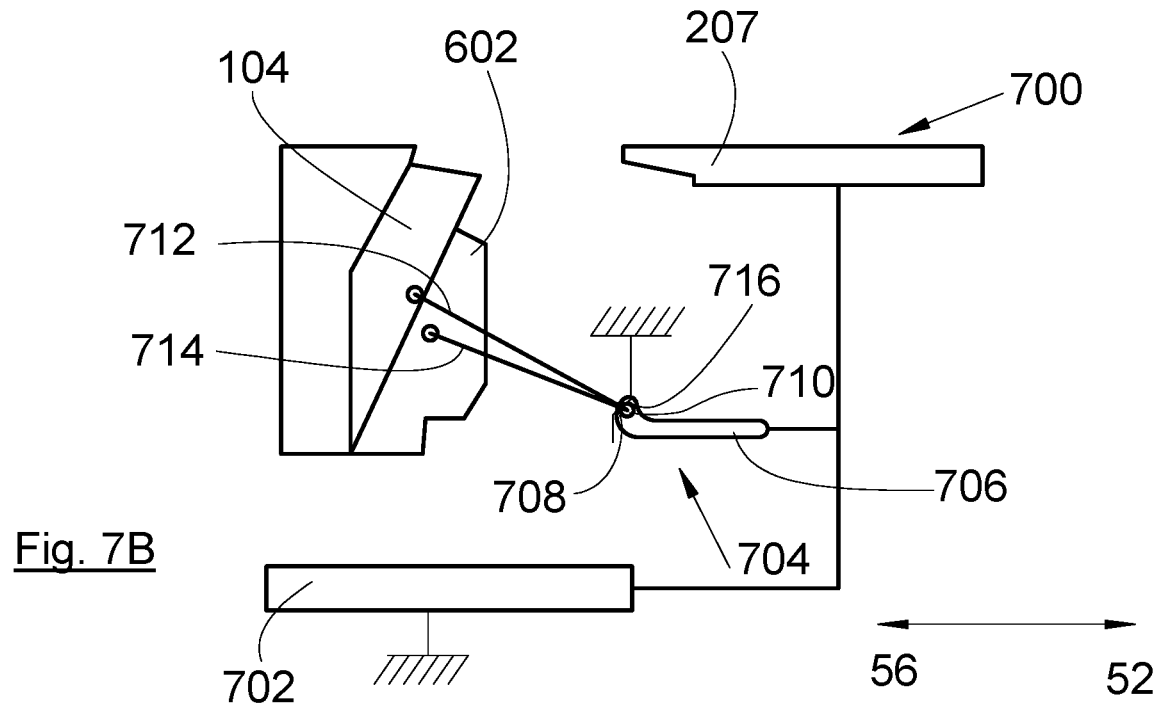
Figure 7C:
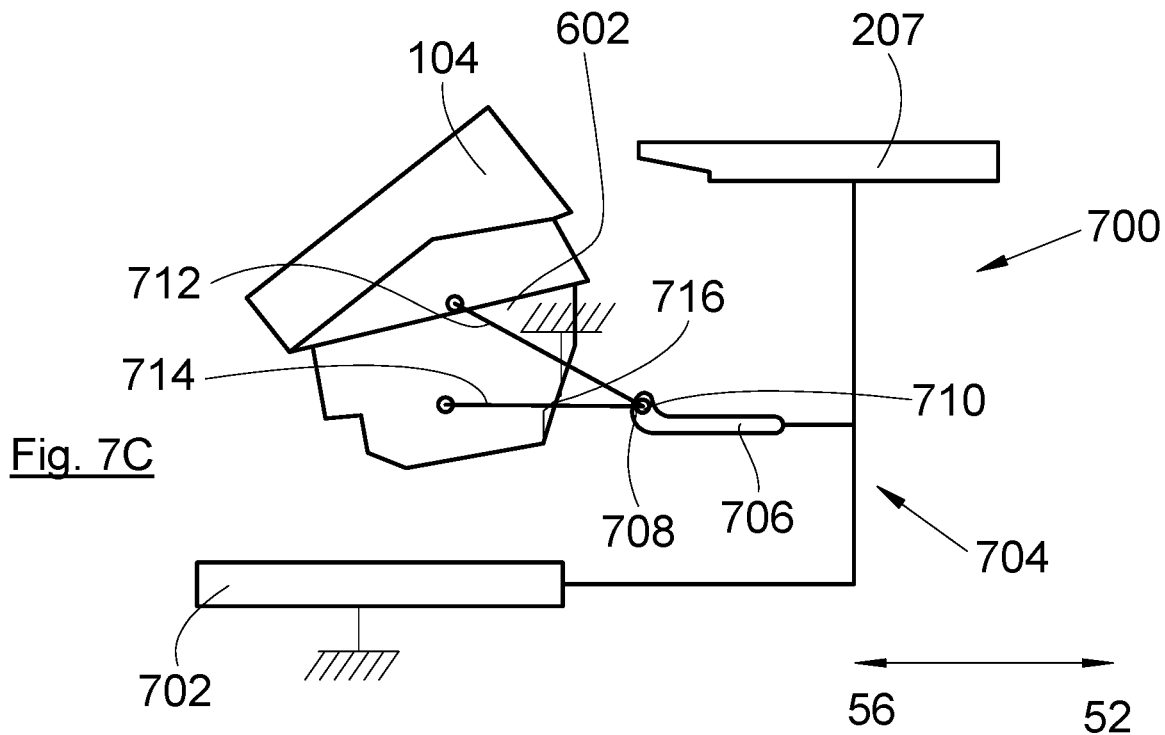

FIGS. 7A-C show an example of a drive mechanism 700 in a closing/closed/retracted position in FIG. 7A, an opening/open/active position in FIG. 7C and an intermediate position in FIG. 7B.

The drive mechanism 700 is described here in the context of the nacelle 600 with the reverser flap 104 and the additional flap 602 and in this embodiment the movements of the reverser flap 104 and the additional flap 602 are delayed relative to the movement of the mobile cowl 207.

The drive mechanism 700 includes a motor element 702 with a mobile part secured to the mobile cowl 207 to drive it in translation. The motor element 702 can for example be an actuator or a motor with a rack.

The drive mechanism 700 features a guide 704 secured to the mobile cowl 207 that includes a slide part 706, the axis of which is parallel to the direction of translation of the mobile cowl 207, and a rotation part 708 that extends forward the slide part 706 and is offset relative to the slide part 706 relative to the translation direction.

The drive mechanism 700 also comprises a slider 710 accommodated in the guide 704.

The drive mechanism 700 also comprises a first articulated link 712 between the slider 710 and the reverser flap 104 and a second articulated link 714 between the slider 710 and the additional flap 602.

The drive mechanism 700 also comprises an abutment 716 that is adapted or configured to move the slider 710 of the rotation part 708 toward the slide part 706 when the reverser flap 104 is in the closed position, the additional flap 602 is in the retracted position and the mobile cowl 207 moves from the opening position to the closing position. Here the abutment 716 takes the form of a ramp that runs down the slider 710.

Operation is then as follows, starting from the closing/closed/retracted position:
- the motor element 702 moves the mobile cowl 207 and the guide 704 in the aft direction 52,
- the slider 710 remains immobile as long as it is in the slide part 706 and neither the reverser flap 104 nor the additional flap 602 moves,
- when the slider 710 has reached the end of the slide part 706, it reaches the rotation part 708 (FIG. 7B), which then constrains the slider 710 to move with the guide 704, which continues to be moved aft in translation by the motor element 702, and
- the continuing translation of the guide 704 in the aft direction 52 drives the movement of the slider 710 in the same direction, which pulls on the first link 712 and the second link 714, causing rotation of the reverser flap 104 and the additional flap 602, respectively, as far as their open/active positions (FIG. 7C) and, at the same time, the mobile cowl 207 reaches the opening position.

Operation is then as follows, starting from the opening/open/active position:
- the motor element 702 moves the mobile cowl 207 and the guide 704 in the forward direction 56 and, as the rotation part 708 is offset relative to the slide part 706, the slider 710 remains wedged therein and moves simultaneously in translation to cause the rotation of the reverser flap 104 and the additional flap 602, respectively, as far as their closed/retracted positions (FIG. 7B), by pushing on the first link 712 and the second link 714,
- the slider 710 then reaches the abutment 716 and the continuing translation of the guide 704 leads to movement of the slider 710 of the rotation part 708 toward the slide part 706,
- the guide 704 continues to move in translation, whereas the slider 710 remains immobile in the slide part 706 until the mobile cowl 207 moves to its closing position (FIG. 7A).

Here the coordinated movement can be achieved by a structure or structures that includes, inter alia, the second link 714.

Figure 8A:
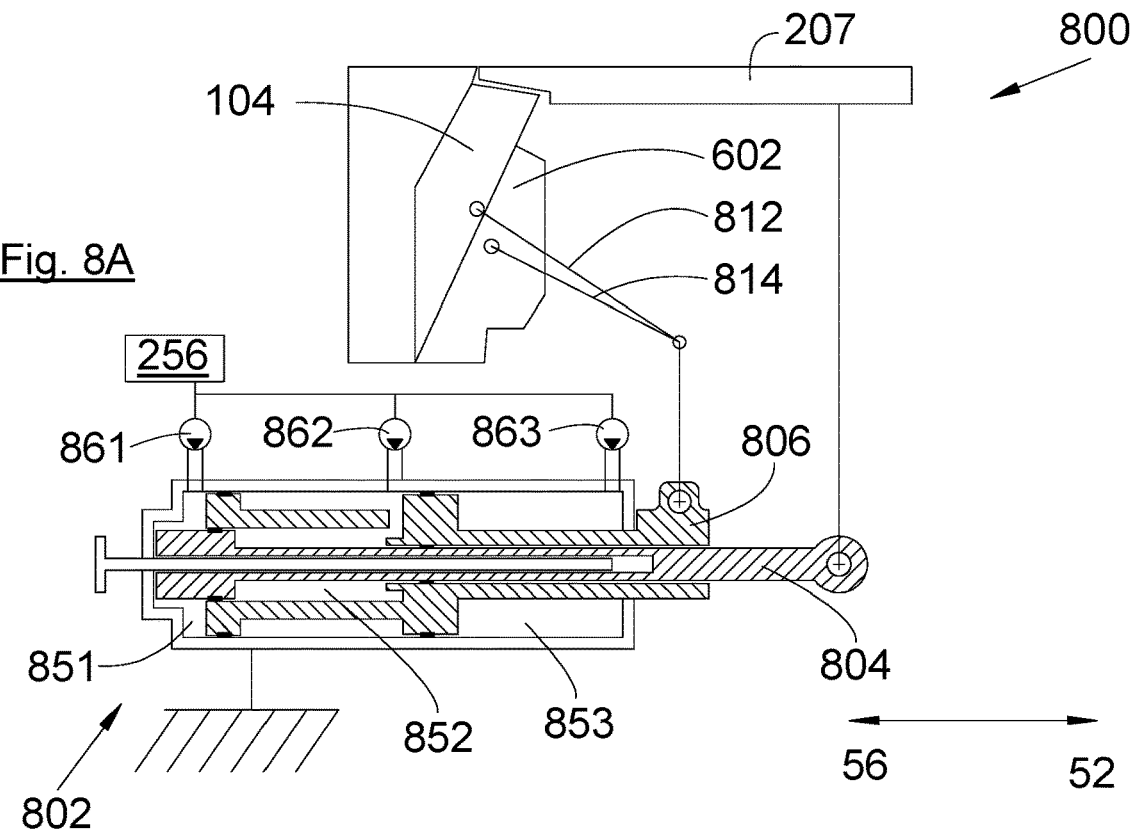
FIGS. 8A-C show another embodiment of a connection between a mobile cowl and a reverser flap in various positions.
Figure 8B:
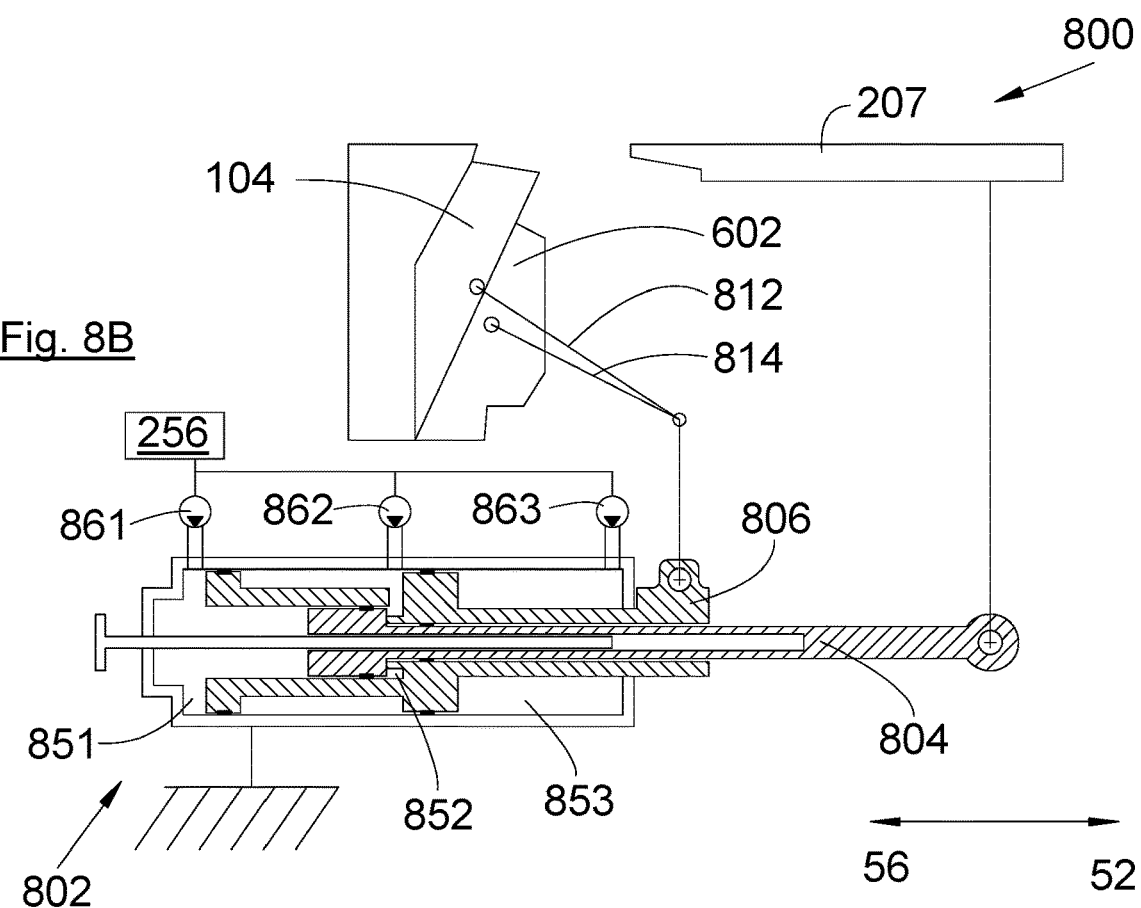
Figure 8C:
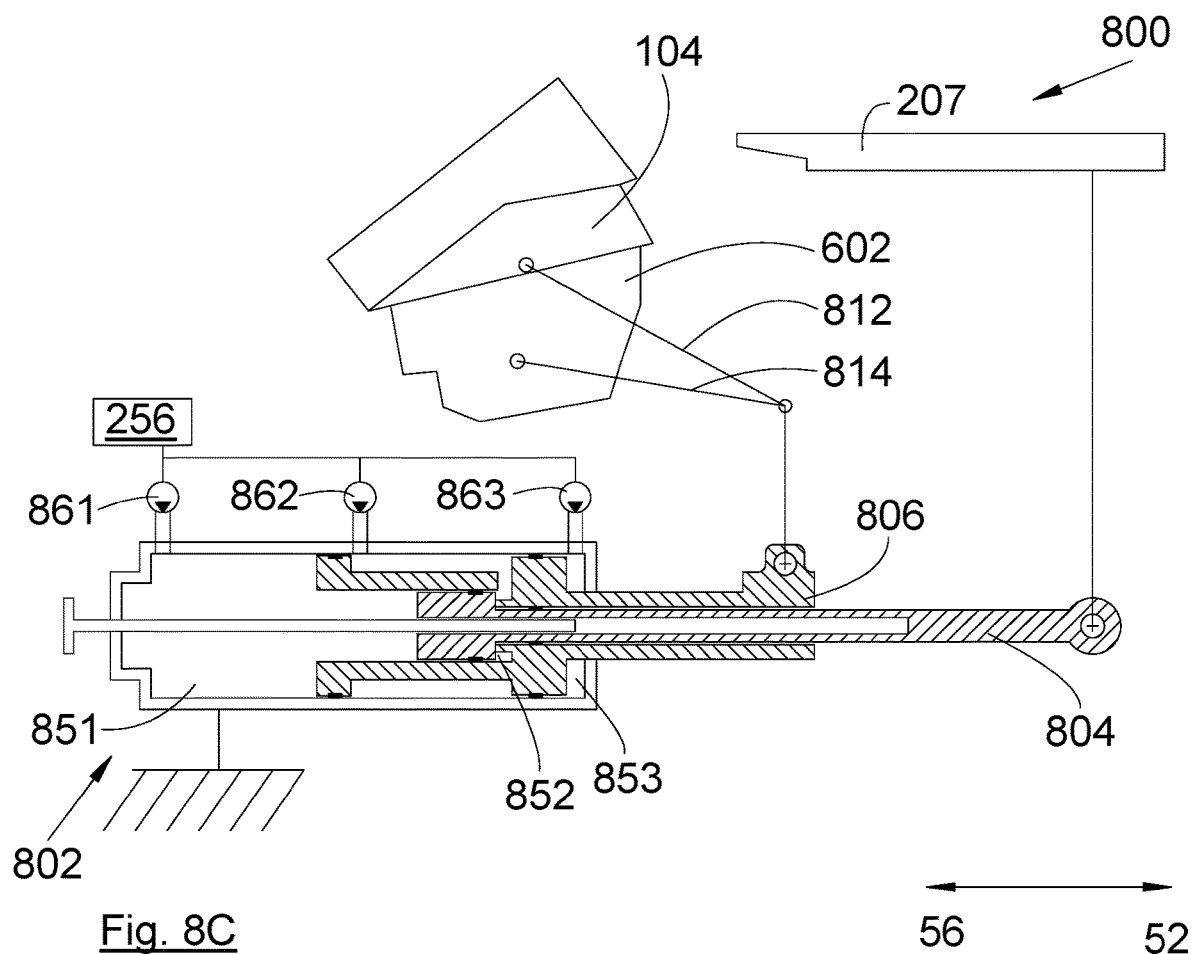

FIGS. 8A-C show an example of the drive mechanism 800 in a closing/closed/retracted position in FIG. 8A, an opening/open/active position in FIG. 8C and an intermediate position in FIG. 8B.

The drive mechanism 800 is described here in the context of the nacelle 600 with the reverser flap 104 and the additional flap 602 and in this embodiment the movements of the reverser flap 104 and the additional flap 602 are delayed relative to the movement of the mobile cowl 207.

The drive mechanism 800 includes an actuator 802 with two rods each constituting a mobile part. The first rod 804 is secured to the mobile cowl 207 to drive it in translation and the second rod 806 is secured to the reverser flap 104 and the additional flap 602 to drive them in rotation. To this end the drive mechanism 800 comprises a first articulated link 812 between the second rod 806 and the reverser flap 104 and a second articulated link 814 between the second rod 806 and the additional flap 602.

Each rod 804, 806 is mobile in translation parallel to the translation direction of the mobile cowl 207 between a retracted position (FIG. 8A) and a deployed position (FIG. 8C).

In the embodiment of the disclosure herein described here, the rods move in the same direction, but a different architecture is possible. In a similar manner, in the embodiment of the disclosure herein described here each rod passes from the retracted position to the deployed position to pass from the closing/closed/retracted position to the opening/open/active position and vice versa, but a different configuration is possible.

The actuator 802 features an activator, one particular embodiment of which is described hereinafter and is adapted or configured to selectively move the first rod 804 and the second rod 806.

Operation is then as follows, starting from the closing/closed/retracted position:
- the activator moves the first rod 804 aft in order to move the mobile cowl 207 in the aft direction 52 as far as an intermediate position (FIG. 8B),
- the activator moves the first rod 804 and the second rod 806 in the aft direction 52 in order to move the mobile cowl 207 in the aft direction 52 to reach the opening position and to pull on the first link 812 and the second link 814, causing the reverser flap 104 and the additional flap 602 to rotate as far as the open/active position (FIG. 8C).

Operation is then as follows, starting from the respective opening/open/active positions:
- the activator moves the first rod 804 and the second rod 806 in the forward direction 56 in order to move the mobile cowl 207 in the forward direction 56 to reach the intermediate position (see FIG. 8B) and to push on the first link 812 and the second link 814, causing reverse rotation of the reverser flap 104 and the additional flap 602 as far as the closed/retracted position (FIG. 8A),
- the activator continues to move the first rod 804 forward in order to move the mobile cowl 207 forward as far as its closing position (FIG. 8A).

Here the coordinated movement can be achieved by a structure or structures that includes, inter alia, the second link 814.

The activator includes, in some embodiments, a hydraulic circuit that comprises:
- a first chamber 851 defined between the end wall of the actuator 802 and the first rod 804,
- a second chamber 852 defined between the first rod 804 and the second rod 806,
- a third chamber 853 defined between the second rod 806 and the front part of the actuator 802,
- a first pressure source 861 adapted or configured to pressurize the first chamber 851,
- a second pressure source 862 adapted or configured to pressurize the second chamber 852,
- a third pressure source 863 adapted or configured to pressurize the third chamber 853,
- the control unit 256 adapted or configured to control each pressure source 861, 862, 863 in order for it to deliver a high pressure, a low pressure or an intermediate pressure.

In the closing/closed/retracted position the pressure distribution is as follows:
low pressure in the first chamber 851, and
high pressure in the second chamber 852 and the third chamber 853.

For the mobile cowl 207 to pass from the closing position to the intermediate position the pressure distribution is as follows:
intermediate pressure in the first chamber 851,
low pressure in the second chamber 852, and
high pressure in the third chamber 853.

For the mobile cowl 207 to pass from the intermediate position to the opening position and for the reverser flap 104 and the additional flap 602 to pass from the closed/retracted position to the open/active position the pressure distribution is as follows:
intermediate pressure in the first chamber 851, and
low pressure in the second chamber 852 and the third chamber 853.

For the mobile cowl 207 to pass from the opening/open/active position to the intermediate position and for the reverser flap 104 and the additional flap 602 to pass to the closed/retracted position the pressure distribution is as follows:
intermediate pressure in the first chamber 851,
low pressure in the second chamber 852, and
high pressure in the third chamber 853.

For the mobile cowl 207 to pass from the intermediate position to the closing position the pressure distribution is as follows:
low pressure in the first chamber 851, and
high pressure in the second chamber 852 and the third chamber 853.

According to one particular embodiment, the high pressure is of the order of 200 bar, the low pressure is of the order of 4 bar, and the intermediate pressure is of the order of 100 bar.

The disclosure herein has been more particularly described in the case of a nacelle under a wing but can be applied to a nacelle located at the rear of the fuselage.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for a turbofan, the nacelle comprising:
a fixed cowl and a mobile cowl, the mobile cowl being mobile along a translation path between a closing position, in which the mobile cowl is adjacent to the fixed cowl, and an opening position, in which the mobile cowl is far aft of the fixed cowl;
a window, which is delimited, on an upstream side thereof, by the fixed cowl and, on a downstream side thereof, by the mobile cowl, wherein the window is open between an airflow of a secondary flow and an exterior of the nacelle;
a reverser flap which is mounted in a manner rotatable about a rotation axis between a closed position, in which the window is obstructed, and an open position, in which the window is not obstructed;
a second flap, which is configured to rotate about a rotation axis between a retracted position, in which the second flap is not positioned in the airflow, and an active position, in which the second flap is positioned across the airflow, and extends from the reverser flap in the open position in the airflow; and
a drive mechanism comprising:
a motor element with a mobile part secured to the mobile cowl to drive the mobile part in translation;
a guide, which is secured to the mobile cowl and comprises a slide part, an axis of which is parallel to the translation path of the mobile cowl, and a rotation part that extends forward from the slide part and is offset relative to the slide part;
a slider accommodated in the guide;
a first link articulated between the slider and the reverser flap;
a second link articulated between the slider and the second flap; and
an abutment configured to move the slider from the rotation part toward the slide part when the reverser flap is in the closed position, the second flap is in the retracted position, and the mobile cowl is moved from the opening position to the closing position;
wherein the drive mechanism is configured to control passage of the reverser flap between and including the closed position to the open position, respectively, along with a passage of the mobile cowl between and including the closing position and the opening position, configured for a first combination assuring, from the closed position and from the closing position:
an aft translation of the mobile cowl along the translation path to move the mobile cowl from the closing position to the opening position, and
a rotation of the reverser flap about the rotation axis to move the reverser flap from the closed position to the open position, and
wherein the drive mechanism is also configured for a second combination assuring, from the open position and from the opening position:
a rotation of the reverser flap in a reverse direction about the rotation axis to move the reverser flap from the open position to the closed position, and
a forward translation of the mobile cowl along the translation path to move the mobile cowl from the opening position to the closing position, and
wherein the drive mechanism is configured to coordinate passage of the second flap from the retracted position to the active position along with the passage of the reverser flap between and including the closed position and the open position.

2. The nacelle of claim 1, wherein the second flap carries a seal that is positioned between the reverser flap and the second flap when the reverser flap is in the open position and the second flap is in the active position.

3. The nacelle of claim 1, comprising at least one deflector that is disposed around the airflow at a level of an entry of the window.

4. The nacelle of claim 1, wherein the drive mechanism is configured to move the reverser flap and the mobile cowl simultaneously.

5. The nacelle of claim 1, wherein the drive mechanism is configured to cause a delayed movement of the reverser flap in the first combination and a delayed movement of the mobile cowl in the second combination.

6. A turbofan comprising:
an engine; and
a nacelle according to claim 1,
wherein the nacelle is configured to surround the engine, and
wherein the airflow of the secondary flow is delimited between the nacelle and the engine.

7. An aircraft comprising at least one turbofan according to claim 6.

\* \* \* \* \*